Oct. 31, 1967      C. W. CLAPP      3,350,623
LINEAR RECTIFIER CIRCUIT
Filed Dec. 20, 1965
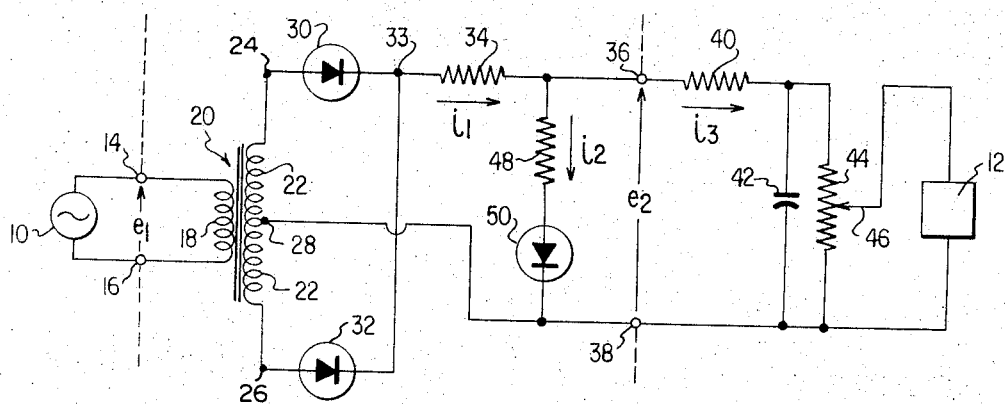
FIG. 1
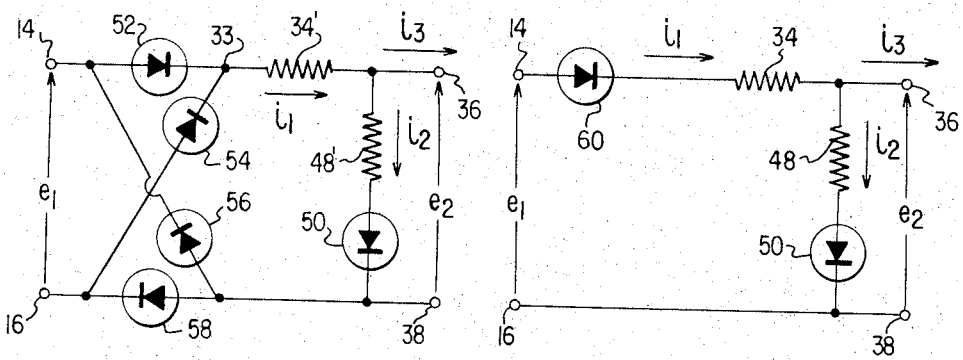
FIG. 2      FIG. 3
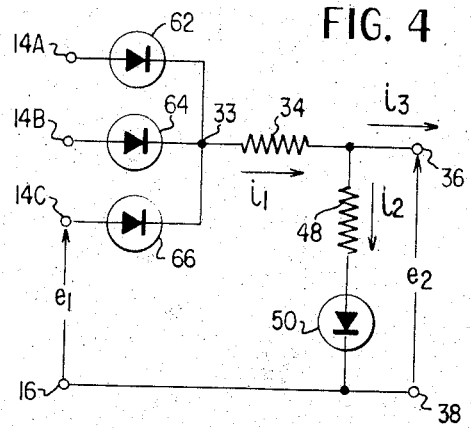 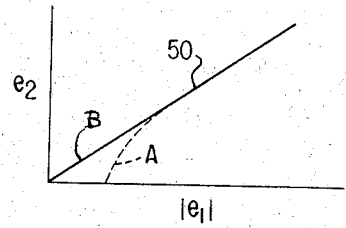
FIG. 4      FIG. 5
INVENTOR
CHARLES W. CLAPP
BY *Richard E. Hosley*
ATTORNEY

United States Patent Office 3,350,623
Patented Oct. 31, 1967

3,350,623
LINEAR RECTIFIER CIRCUIT
Charles W. Clapp, Lynn, Mass., assignor to General Electric Company, a corporation of New York
Filed Dec. 20, 1965, Ser. No. 514,922
10 Claims. (Cl. 321—8)

This invention generally relates to a rectifier circuit. More particularly, the invention relates to a rectifier circuit having a direct current output which varies linearly with an alternating current input.

With the advent of semiconductor rectifiers, the use of rectifier circuits has increased substantially in many areas of electronics, including electronic measurement, where it is necessary to convert an alternating current signal to a direct current signal. Typical applications of rectifier circuits include vacuum tube voltmeters used to measure alternating currents or voltages, tachometers wherein alternating tachometer generator current is converted to a direct current output signal, or amplifier circuits wherein it is desirable to convert an alternating current signal to a varying direct current signal which is subsequently coupled to an amplifier input. When such rectifier circuits are used, it is desirable, and often necessary, that a high degree of linearity between the input and the output signals exist. However, semiconductor rectifiers are not linear devices in the forward conduction state as is evidenced by typical instantaneous forward voltage drop curves. Examination of these curves shows that the ratio of the forward voltage drop to the forward current is not constant but varies with the current. Hence the forward diode resistance is a function of the forward current. Therefore, when semiconductor rectifiers have been used in these applications, the nonlinearity of the semiconductor rectifiers has been evidenced by an output signal which does not vary linearly with the input signal.

Where accurate readings have been required, any one of several possible corrective courses of action, or a combination thereof, have been taken in the prior art. Inaccuracies due to nonlinearity have been minimized by calibrating the scale of a readout means connected to the rectifier output. In this procedure, scales are individually calibrated to obviate the inaccuracies so that an accurate reading is obtained. As is evident to those skilled in the art, this corrective procedure is inadequate in several respects. First, calibration is practicably infeasible because extreme expense, lost production, low production, and other factors necessarily result when each readout means and each scale thereon must be calibrated. Further, as semiconductor rectifiers are sensitive to changes in temperatures, readings from calibrated scale would be accurate only at the calibration temperature. In addition, the nonlinearity of the system would still exist. If the rectifier output signal was to be used to control something other than the readout means, such as a computer, amplifier, or other means dependent upon a linear input, this course of action would be ineffective.

Therefore, it is an object of this invention to provide a rectifier circuit wherein the output signal varies linearly as the input signal.

It is another object of this invention to provide a linear rectifier circuit wherein the linearity is substantially unaffected by temperature changes.

Another object of this invention is to provide a rectifier circuit wherein the nonlinearity is minimized.

Still another course of corrective action which has been taken has been to minimize the nonlinearity by proper selection of the rectifier and operating voltages so that the forward voltage drop of the rectifier is negligible with respect to the output voltage. This procedure is commonly known as "swamping out" the effect of the diode. However, when relatively low input and output signals are encountered, this method is not an effective solution.

Therefore, it is still another object of this invention to provide a rectifier circuit wherein inaccuracies introduced by the nonlinearity of the semiconductor rectifiers are substantially eliminated throughout the operating range of the semiconductor rectifiers.

Briefly stated, a conversion circuit which embodies the invention comprises a rectifier circuit which energizes a series circuit including two substantially resistive impedances and a semiconductor rectifier in response to a varying alternating current input signal. Substantially resistive load means are energized by the rectifier circuit output and are connected in parallel with the second impedance and the semiconductor rectifier. If the ratio of the first impedance to the second impedance is substantially the same as the ratio of the number of rectifiers in the rectifier circuit conducting in series at any instant to the number of rectifiers in the series circuit and if the resistive load input impedance is relatively high with reference to the series impedance of the second impedance and the rectifier, the load is energized with a direct current voltage which varies linearly with the alternating current rectifier circuit input signal.

The novel features which are characteristic of this invention are set forth with particularity in the appended claims. The invention itself, however, as to its organization, together with further objects and advantages, may be understood by reference to the following description of various embodiments of a linear rectifier circuit taken in conjunction with the accompanying drawings and description.

FIGURE 1 schematically illustrates a circuit which embodies this invention.

FIGURES 2, 3, and 4 illustrate alternate embodiments of rectifier circuits constructed in accordance with this invention.

FIGURE 5 illustrates the relationship between the output and input voltages of a rectifier circuit which embodies this invention.

As several embodiments which utilize the invention have been presented in the various figures, similar components and elements have been designated by the same number in each of the figures.

FIGURE 1 schematically reveals a linear rectifier circuit which converts alternating current signals of varying magnitude from AC source 10 to a direct current output voltage for a utilization means 12 such as a vacuum tube voltmeter, direct current meter or amplifier circuit. AC source 10 is coupled to the linear rectifier circuit by terminals 14 and 16 which serve as a connecting terminus for a primary winding 18 of transformer 20. Transformer 20 has a center tap secondary 22 including terminals 24 and 26 and a center tap 28. Rectifiers, shown as diodes 30 and 32, are connected between terminals 24 and 26 and rectifier output terminal 33 in a center-tapped, full-wave rectifier configuration. A first, substantially resistive impedance, shown diagrammatically as first resistor 34, couples rectifier output terminal 33 to positive load terminal 36. Negative load terminal 38, connected to center tap 28, constitutes a return path for the rectifier circuit. In addition, load terminals 36 and 38 serve as a coupling junction for a load circuit to be energized by the linear rectifier circuit.

A representative load circuit shown in FIGURE 1 comprises resistor 40, capacitor 42, and an optional potentiometer 44. Resistor 40 is chosen so that the entire load circuit exhibits a relatively high input impedance to both AC and DC currents, and it is connected in series with positive load terminal 36. Utilization means 12 is then connected to negative load terminal 38 and to slide wire 46 associated with potentiometer 44 which is connected between negative load terminal 38 and load input resistor 40. By using potentiometer 44, it is possible to adjust the full scale excursion of the output signal applied to utilization means 12. If it is not desired to use potentiometer 44, utilization means 12 may be connected directly across capacitor 42.

Linearity between the input and the output signals is introduced by shunting the load circuit with a series circuit including second resistor 48 and rectifier 50. Operation of the circuit is most easily understood by resort to mathematical analysis. However, in order to present such a mathematical analysis, it is necessary to assume the following optimum operating conditions:

(1) That the forward conducting characteristics of all the rectifiers in the circuit are identical;

(2) That the rectifiers do not conduct current when they are reverse biased; and (3) That the load current is negligible compared with the forward rectifier current.

In the following analysis the resistance of the first resistor 34 is designated by $R_{34}$ and the current therethrough by $i_1$; the resistance of the second resistor 48, by $R_{48}$ and the current therethrough by $i_2$. Current through load input resistor 40 is designated by $i_3$. In addition, the forward resistances of rectifiers 30, 32, and 50 are designated $r_{30}(i_1)$, $r_{32}(i_1)$ and $r_{50}(i_2)$, respectively, since the resistances are assumed to be functions of the forward current in each case.

Utilizing Kirchoff's Law and further assuming that the turns ratio of transformer 20 is unity, it can readily be seen that the following ratio of $e_2:e_1$ results during half cycles when terminal 24 is positive:

(1) $$\frac{e_2}{e_1} = \frac{R_{48} + r_{50}(i_2)}{r_{30}(i_1) + R_{34} + R_{48} + r_{50}(i_2)}$$

Referring to the circuit in FIGURE 1, (2) $$i_1 = i_2 + i_3$$

However, if the load current $i_3$ is negligible, as stated in the third assumption above, then (3) $$i_1 = i_2 = i$$

If, in addition, the forward conducting characteristics are identical, as in the first assumption above, then (4) $$r_{30}(i_1) = r_{32}(i_1) = r_{50}(i_2) = r(i)$$

Substituting (4) in Equation 1 the ratio $e_2:e_1$ becomes:

(5) $$\frac{e_2}{e_1} = \frac{R_{48} + r(i)}{R_{34} + R_{48} + 2r(i)}$$

Now, if $R_{34} = R_{48}$, it can be seen that (6) $$\frac{e_2}{e_1} = \frac{1}{2}\left[\frac{R_{48} + r(i)}{R_{48} + r(i)}\right]$$

or (7) $$e_2 = \frac{1}{2} e_1$$

On the negative half-cycle of the voltage $e_1$, rectifier 32 takes the place of rectifier 30, but since all rectifiers are assumed to have the same forward characteristic, we again have (8) $$e_2 = \frac{1}{2}|e|$$

Hence, over the whole cycle, Equation 8 is valid and the average or direct current component of the output voltage $e_2$ is directly proportional to the average rectified value of input voltage $e_1$.

Using the same type of analysis, it is possible to obtain a ratio for $R_{34}$ and $R_{48}$ which is valid for any configuration. Let $N_1$ represent the number of rectifiers conducting in series at any given time in the rectifier circuit; and $N_2$, the number of rectifiers in the series circuit. Also assume that (9) $$R_{34} = aR_{48}$$

Substituting (9) in (1),

(10) $$\frac{e_2}{e_1} = \frac{R_{48} + N_2 r(i)}{R_{48}(a+1) + (N_1 + N_2) r(i)}$$

The term $[R_{48} + N_2 r(i)]$ in Equation 10 can be eliminated from if

(11) $$a = \frac{N_1}{N_2}$$

and

(12) $$R_{34} = \frac{N_1}{N_2} R_{48}$$

Using this relationship, Equation 8 becomes

(13) $$e_2 = \frac{N_2}{N_1 + N_2}|e_1|$$

In actual practice, the three optimum operating conditions set forth above can be approached. Matched rectifiers are available so that variations of the parameters over an anticipated operating range will be substantially identical. If matched rectifiers are not practicable, the rectifiers in the series circuit can be chosen to approach the average characteristics of the remaining rectifiers. Silicon diodes have a ratio of reverse current at a peak reverse voltage to the maximum forward current which can exceed 1:5000 under normal conditions. While there is reverse conduction, it is negligible in comparison to the forward current. Even germanium diodes, which have a much lower ratio of peak reverse current to maximum forward current, approach this optimum condition of no reverse current. Finally, it is also possible to make the load current negligible by utilizing a load circuit having an input impedance which is much greater than the total impedance of second resistor 48 and rectifier 50. Even if the three optimum conditions cannot be met exactly, deviations from linearity are much smaller than those encountered when the linear rectifier circuit is not used. In addition, it has been found in practice that, by changing the ratio of $R_{34}$ to $R_{48}$ slightly from its exact theoretical value, it has been possible to compensate partially for the effects of mismatched rectifiers and for a nonzero load current $i_3$.

Referring to FIGURE 2, it can be seen that the rectifier circuit connected to input terminals 14 and 16 and terminals 33 and 38 has been changed to a full wave bridge rectifier including four rectifiers 52, 54, 56, and 58. Assuming the same optimum operating conditions discussed above, it can be seen that during both half-cycles of current flow two rectifiers in the rectifier circuit are conducting in series, simultaneously. Utilizing Equations 12 and 13, it can be seen that for linear operation, $R_{34}$ must be substantially two times $R_{48}$. With this relationship between first and second resistors 34 and 48, the average value of the output voltage will be one-third the average value of the input voltage.

In the half-wave rectifier circuit of FIGURE 3, $R_{34}$ equals $R_{48}$ using Equation 12. This results in an output voltage $e_2$ equal to $\frac{1}{2} e_1$ during one half cycle of $e_1$ and equal to zero during the other half cycle of $e_1$. The ratio of the average output voltage to the average input voltage is therefore one quarter.

FIGURE 4 shows an embodiment of the linear rectifier circuit adapted to be connected to a four-wire, three-phase alternating signal source. Rectifiers 62, 64, and 66 are connected to terminals 14A, 14B, and 14C from phases A, B, and C, respectively, while terminal 16 is connected to the neutral wire of the source. Cathodes of rectifiers 62, 64, and 66 are connected in common to first resistor 34. In a three-phase rectifier circuit such as is shown in FIGURE 4, there will be, in each cycle, three brief time intervals during which two of the three rectifiers 62, 64, 66 will conduct current simultaneously. During the remainder of each cycle, only one of these three rectifiers will conduct. However, under ordinary circumstances, the three brief intervals mentioned above constitute such a small part of the whole cycle that they may be safely ignored and it can be assumed that only one of these three rectifiers conducts at a time. Therefore, the three-phase half wave rectifier shown in FIGURE 4 can be treated as a single phase half wave rectifier as shown in FIGURE 3 and the same relationships between first and second resistors 34 and 48 pertain and a linear relationship exists between the input and output voltages.

FIGURE 5 presents a graphical representation of the relationship between the output voltage $e_2$ applied to a resistive load and the absolute value of the input voltage $e_1$. Curve A, shown by the dashed line, represents the output voltage in terms of a varying input voltage encountered when a standard rectifier circuit is used. It is shown in comparison to curve B which represents the output of the linear rectifier circuit. The relationship of the output voltage to input voltage is substantially linear throughout the range of the rectifier circuit, and the slope of curve B is determined by the number of rectifiers which are used in the circuit.

Summarizing briefly, it can be seen that the linear rectifier circuit which forms this invention can be used in any circuit requiring a standard rectifier. A series circuit comprising two substantially resistive impedance means and one or more rectifiers is coupled across the rectifier circuit output. If the ratio of the first impedance to the second impedance is substantially the same as the ratio of the number of rectifiers conducting in series in the rectifier circuit to the number of rectifiers in the series circuit, if all the rectifiers have similar characteristics, and if a load placed in parallel with the second impedance and the series rectifiers is large in comparison thereto, a linear output signal is obtained for the load means.

While the present invention has been described with reference to particular embodiments, various modifications may be made by those skilled in the art without actually departing from the spirit and scope of the invention. Therefore, the appended claims are intended to cover all such equivalent variations which come within the true spirit and scope of the invention.

What I claim as new and desire to secure by Letters Patent of the United States is:

1. A circuit to convert a varying amplitude alternating current input signal to a direct current output signal directly proportional thereto comprising:
   (a) a plurality of like rectifiers,
   (b) a rectifier circuit including at least one of said rectifiers to convert the alternating current signal to a direct current signal,
   (c) a series circuit connected in series with said rectifier circuit and comprising first and second substantially resistive impedance means and at least one of said rectifiers, said first impedance means being connected to said rectifier circuit, the ratio of said first impedance means to said second impedance means being substantially equal to the ratio of the number of said rectifiers conducting in series at any instant in said rectifier circuit to the number of said rectifiers in said series circuit, and
   (d) a load in parallel with said second impendance means and said series circuit rectifier means, said load having a high impedance to alternating and direct currents relative to the impedance of said series circuit.

2. A circuit as recited in claim 1 wherein said rectifier circuit comprises a center-tapped full-wave transformer-rectifier circuit, the ratio of said first impedance means to said second impedance means being substantially equal to unity.

3. A circuit as recited in claim 1 wherein said rectifier circuit comprises a full-wave bridge rectifier, the ratio of said first impedance means to said second impedance means being substantially equal to two.

4. A circuit as recited in claim 1 wherein said rectifier circuit comprises a half-wave rectifier and the ratio of said first impedance to said second impedance means being substantially equal to unity.

5. A circuit as recited in claim 1 wherein said rectifier circuit comprises a three-phase half-wave rectifier circuit and the ratio of said first impedance to said second impedance means being substantially equal to unity.

6. A circuit as recited in claim 1 wherein said rectifiers are constituted by a plurality of semiconductor diodes, said series circuit comprising first and second resistors and at least one of the diodes, the ratio of the first resistor to the second resistor being substantially equal to the number of diodes conducting in series at any given time in said rectifier circuit to the number of diodes in the series circuit.

7. A circuit as recited in claim 6 wherein the rectifier circuit comprises a center-tapped transformer secondary with each diode having one electrode thereof connected to each terminal of the transformer, the other electrodes being connected together to form a center-tapped full-wave rectifier circuit, the ratio of the first resistor to the second resistor being substantially equal to unity.

8. A circuit as recited in claim 6 wherein said rectifier circuit comprises a full-wave bridge rectifier including a diode in each leg thereof, the ratio of the first resistor to the second resistor being substantially equal to two.

9. A circuit as recited in claim 6 wherein the rectifier circuit comprises a half-wave diode rectifier, the ratio of the first resistance to the second resistance being substantially equal to unity.

10. A circuit as recited in claim 6 wherein the rectifier circuit comprises three diodes, each diode having one electrode connected to said first resistor, each of the other electrodes being individually connected to one of the three terminals of a three-phase source, the ratio of the first resistor to the second resistor being substantially equal unity.

References Cited

UNITED STATES PATENTS

| | | | |
|---|---|---|---|
| 2,612,630 | 9/1952 | Greenleaf | 321—32 |
| 2,881,382 | 4/1959 | Amato | 321—8 XR |
| 3,309,599 | 3/1967 | Broomhall | 321—24 |
| 3,267,351 | 8/1966 | Martin | 321—16 XR |

JOHN F. COUCH, *Primary Examiner.*

W. M. SHOOP, *Assistant Examiner.*